Sept. 19, 1961 W. DANZIGER ET AL 3,000,539
VENDING MACHINE
Filed Oct. 10, 1955 9 Sheets-Sheet 1

INVENTORS
William Danziger
Harold Roth
BY
James C. Ledbetter
ATTORNEY

Sept. 19, 1961  W. DANZIGER ET AL  3,000,539
VENDING MACHINE
Filed Oct. 10, 1955  9 Sheets-Sheet 3

FIG. 5

INVENTORS.
William Danziger
Harold Roth
BY
James C. Ledbetter
ATTORNEY

Sept. 19, 1961 W. DANZIGER ET AL 3,000,539
VENDING MACHINE
Filed Oct. 10, 1955 9 Sheets-Sheet 4

FIG. 6

INVENTORS
William Danziger
Harold Roth
BY James C. Ledbetter
ATTORNEY

United States Patent Office 3,000,539
Patented Sept. 19, 1961

3,000,539
VENDING MACHINE
William Danziger, Franklin Square, and Harold Roth, Hewlett Neck, N.Y., assignors to Continental Vending Machine Corp., Westbury, N.Y., a corporation of New York
Filed Oct. 10, 1955, Ser. No. 539,394
10 Claims. (Cl. 221—129)

This invention relates to a new and more useful vending machine of the coin-controlled type for storing and selling cigarettes, chewing gum, candy and the like.

By way of introduction, it is pointed out that the many different brands of goods which are on the market in packaged form pose problems in respect to the manufacturing and servicing of vending machines. The increasing popularity of machines for merchandising goods makes for new requirements in engineering improvements which will handle more of the brands currently manufactured than conventional machines can offer for sale.

In the cigarette field, there is currently a further increase of brands by reason of the king size and the filter tip cigarettes which are being offered to satisfy more customers. The result is that there are so many different brands, and also different species of the same brands, that more than one machine is sometimes required by stores, restaurants, and the like, to meet the need for increased variety (more brands) of cigarettes.

There is the further problem in respect to machine size and floor space occupied. If the machine is of large capacity, it usually means that it merely stores more packages of like brands, rather than more packages of different brands and species, thus lacking variety; and the complexity of mechanism increases in proportion. It appears that reduced size, simpler machines and larger variety are problems awaiting solution.

In the beginning, the art developed the practice of providing a separate storage hopper containing a column of packages of like brand cigarettes, another hopper for packages of another brand, and a plurality of hoppers for as many of the numerous brands on the market as space would permit in the machine housing. Prior patents provide several forms of upright hopper means (movable, stationary, and other types) for storing and vending cigarettes, especially so in respect to increasing the number of packages (machine capacity) of the same brand.

Furthermore, the art provides various modes of package discharge, such as ejection from the top as well as from the bottom of the hoppers, and from the front as well as from the rear. In addition, both manually operated and motor driven vending machines are known in the art.

In order to enlarge the package capacity—and at the same time conserve width (the frontal spread) of the machine as well as its height—the art provides rows or tiers of package hoppers arranged in parallel relation, one row in front of another. Prior patents show two rows and three rows, etc., of storage hoppers, and the more rows the greater the storage space for the stock piling of packages. In the present state of the art, this multi-row expedient does not increase the variety where the rear hopper contains the same package brand as the front hopper and is used merely to increase the capacity by supplementing or resupplying the front hopper.

Furthermore, such multi-row hopper expedient increases the machine depth and introduces other problems. It does not appear that the art has developed in the direction of providing simple and compact selection means applicable to the rear row of hoppers, by which to utilize the rear hoppers more fully as a means for increasing the choice range (variety), and for satisfying more customers by displaying and vending more brands and species thereof.

Seemingly, the art has remained content, in a large measure and with the one purpose, merely to improve in the direction of enlarged storage (more packages) of popular brands. This has been achieved by increasing the number of hoppers, usually multi-row hoppers (one row behind the other), which serves that purpose very well. The Gross Patent 2,660,282 (FIG. 17), issued November 24, 1953, is an example thereof.

It is believed that the art is receptive, and indeed the trade demonstrates a want, for improvements in the new direction herein of increased variety of brands and species thereof. This seems of major importance. Accomplishing the latter and also economizing in space, as well as making other improvements in the multi-row hopper machine (several hopper rows) are problems sought to be solved by this invention.

A major purpose of the invention is to conserve space by adopting new principles in a vending machine specially devised for selling a large variety of merchandise, by producing a machine of small size, as of a console type, for a given capacity (number of packages stored for sale), wherein the components are so constructed and space arranged in relation to each other that they occupy a minimum of space and, in some of the novel arrangements of parts, the space necessary for one component also accommodates another—in effect using the space twice to achieve the aims herein.

Another purpose is to provide a vending machine, of the multi-row package hopper type, characterized by a new and compact form of package ejecting means selectively operative with each and every hopper of all rows thereof, in order that all rear hoppers may store and sell package brands and species thereof which differ from those of the front hoppers, thus for the purpose of vending as many different varieties as the total number of hoppers in all tiers or rows of this new machine.

Having the foregoing in mind, it is also a purpose to provide a vending machine having a novel multi-row hopper arrangement of minimum parts, and wherein all hoppers (front and rear alike) are serviced with package replenishment from the front of the machine, such machine delivering its packages in a novel manner from both rear and front hopper rows, preferably from the front sides of all hoppers of all rows thereof, and by a single operating means of simplified form, such as a single motor means when the new machine herein is of the electrically operated type.

The drawings:

The accompanying drawings and this specification, as well as the claimed subject matter, disclose the invention as preferred and embodied at this time for understanding the problems sought to be solved. Since the teachings herein may suggest changes to others who wish to avail themselves of the benefits of the invention, it will be appreciated that subsequent modifications hereof may well be equivalent in form and hence the same in spirit and principle as this disclosure.

In the example illustrated—for demonstrating the principles of the invention—a two row hopper machine is shown which doubles the variety of packaged goods for sale and, if desired, additional hopper rows may be adapted for further increase of variety. Also, an electric motor is shown for operating the machine, but the circuitry thereof is omitted for clarity since the present invention relates to mechanical parts.

In demonstrating the new principles herein, it is preferred to illustrate a machine having its discharge mode of operation (package ejectment) related to the bottom of the hoppers and also with its vend direction from the front sides thereof. Regarding these two preferences, one will understand from a study of this disclosure that modified or equivalent means of simple and comparable form may be readily adapted to top and/or rear vend or discharge of packages from the hoppers. In either or both modifications, the final vend direction is the same, in that the selected package is received in a delivery tray accessible to the customer either at the front of the machine or at one end thereof.

A complete summary of the invention is next given by describing the several views of the drawings, thus at the outset pointing out the relations between units of the machine, the normal (still) position of parts, and the operative (active) positions thereof. In this way, comparison is facilitated of modified and structural equivalents having similar operating modes.

Accordingly, the views are described in a way to give a first-hand and overall understanding of the principles in which the inventive concept inheres, whereas the detailed and numbered parts later described merely relate to one example of the invention embodied in a motor driven machine, of multi-row hopper type, which vends from the bottoms and from the front sides of its hoppers, all in a manner preferred herein.

The next two views supplement FIGS. 2 through 6, in showing the relation between the housing unit and the mechanized chassis unit, being thereby helpful in understanding of the space saving and other features inherent in this dual-unit combination.

FIG. 8 is a vertical section, measured from 8 to 8, on FIG. 7, through the rear of the two units of the machine. However, the chassis is pushed all the way into the housing, showing a rear fixed stringer plate serving several purposes, to wit, as a mounting for the stationary rear row of hoppers, as a brace for the upper framework of the chassis, and as a location stop for the chassis when it is pushed into its housing.

The remaining views are made of the swingable package ejecting cradle sets (previously shown in FIGS. 5 and 6) and their fore and aft swing relation with the hopper row units and other elements. This is a new combination providing for brand selection, in a new way, from both the rear and front rows of package hoppers.

FIG. 9 is a top view (hoppers removed) of three package ejecting units mounted in a swingable cradle, thus a cradle set. The view is obtained from the front of the machine, by looking down upon one of the cradle sets, and best identified by the arrow line 9 (see FIGS. 5 and 6), just under the rear hopper row and above the rear cradle set for that hopper row.

Each cradle set comprises an elongated cradle member swingably supporting as many package ejecting units as there are hoppers in a row, and there is one cradle set under each hopper row. A finger and its solenoid constitute the package ejecting unit, one such unit for and operative under each hopper of each row thereof.

FIG. 10 is made on any one of the three section lines 10 of FIGS. 9 and 12 (but with a respective hopper in place), being a side view, and looking axially of a single pivotal ejecting finger under its hopper and also under a leaf-spring latch (for the finger) on the back side of the hopper. The finger is at rest, since its actuating solenoid is not yet energized.

FIG. 11 is a view on either one of the two section lines 11, on FIGS. 9 and 12, being an action view of FIG. 10. The solenoid is energized and has pivoted (see dotted curved arrow) its finger upward, where it is latched in ejecting alignment with a selected package in readiness for pushing it outward from the lower end of its hopper, when the two cradle sets swing forward as one. Note this action in FIG. 6 (dotted line) position.

FIG. 12 is a rear view of FIG. 9 (hoppers and packages in place) of the rear cradle set. This view is obtained from the rear of the machine, as viewed at the arrow line 12 (see FIG. 6), except that it shows only two package ejecting units. The finger on the left is down, thus inactive and below its package. The finger on the right has completed its lift, is held in up position by the previously named leaf-spring latch, and thus active behind the package in readiness to eject it.

It is important to note that once a finger is latched in up position, it remains there after its solenoid is de-energized when the customer releases the switch button (FIG. 1), after making a package selection. This latching feature will be understood from the views which follow.

FIG. 15 completes FIG. 14 action and is a perspective of FIG. 13. The leaf-spring latch has flexed back to its normal position and caught underneath the upwardly pivoted ejecting finger to latch it up, after which the solenoid is de-energized, and is in readiness to advance (note arrow) to the position shown in FIGS. 16 and 17.

Once latched up, the ejecting finger has then established (or recorded) a package selection, against all other fingers of the two (or all) cradle sets. The machine must then make a full run (one cycle) before the established selection is cancelled, i.e., the two cradles must swing forward (as one) to their package ejected (dotted line, FIG. 6) position and then back again to starting (full line) position before another package selection can be made.

*FIGS. 6 and 18 through 22*

It has been importantly noted (*a*) that FIG. 6 of the drawings shows the fore and aft swing (arcuate) positions of the two ejecting cradle sets at rest (full line) under their respective rear and front hoppers, and (*b*) that the cradle pair is first swung forward one-half cycle to its package ejected (dotted line) position and then is returned to its starting (full line) position to complete its full cycle. FIGS. 18 to 20 develop FIG. 6, add the package ejecting units thereto, and illustrate their mode of arcuate operation in three stages through the half-cycle forward motion.

FIGS. 18 to 20 show action views applicable only to the rear hopper unit, the one at the right in each of the three views. Thus it is observed that a customer has selected a package brand from a rear hopper. Therefore, the front package ejecting unit is idle, but the front cradle carrying it moves (swings) forward and out of the way of the selected rear package as the latter is ejected forwardly.

FIGS. 18 to 20 show packages in the lower ends of the rear and front hoppers adapted to a forward (front) direction of discharge. Also, a downward and forward inclined chute is provided, along which a package slides directly (shortest distance of travel) to the delivery tray at the front of the machine. Furthermore, these three views show a front package guide and a baffle plate (a one-piece member) disposed above the chute just forward of the front cradle set. This guide and baffle member was omitted from FIG. 6 for clarity.

It is found (as in FIGS. 6 and 18 to 20) that the arcuate swing arrangement of the package ejecting units for the inset-hopper-end arrangement (one end below the other) has substantial space saving and other functional advantages. With the arcuate swing shown, (1) the front pivoted cradle set nests within the inset space, (2) the rear pivoted cradle set finds its swing path along and closely adjacent the underside of the package chute and, at the same time, (3) an eject finger pivoted on the swingable cradle set has the necessary lineal motion required for package ejection.

Such compact nesting-and-swinging mode of operation—converting angular to lineal motion required for package ejection—is achieved by modifying the long radius of the pivoted swing arm by the short radius of the pivoted ejecting finger. The dual radii cooperate to permit the pivoted finger having angular travel to also travel in a straight line along the package shelf to discharge a package therefrom.

FIG. 19 action is a continuation of the forward motion in FIG. 18, in that the two cradle sets are swinging forward as one. The moving ejecting finger has dropped off its latch (FIG. 15) and onto the package shelf. The selected package is being ejected (see FIG. 19 arrow) from the rear hopper toward the chute (as in FIGS. 16 and 17).

Figure 1:
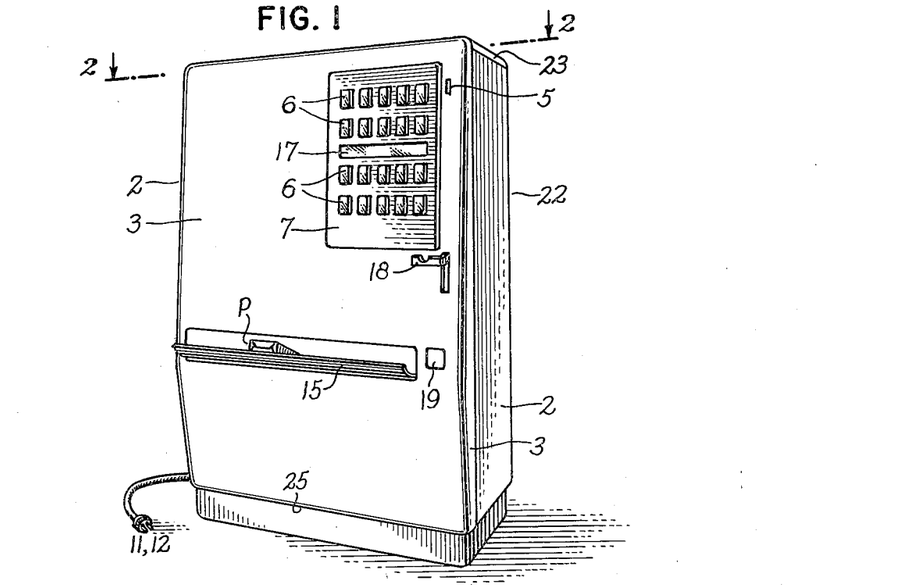
FIG. 1 is a perspective view of the vending machine housing or cabinet of a console type, as seen from the front right. This is illustrative of two aesthetic aspects, to wit, a Design for Vending Machine Button Panel and a Design for Vending Machine Cabinet. Other parts are shown to aid general understanding but are claimed in copending applications.
Figure 2:
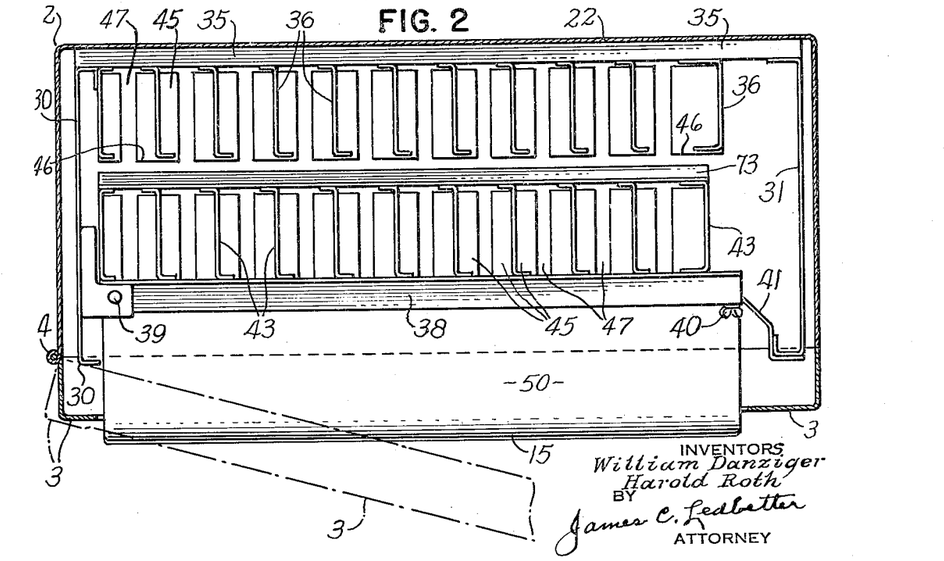
FIG. 2 is made on the section plane 2—2 of FIG. 1 through the housing only, thus looking down into it and showing the upper ends of the rear and the front rows of package hoppers (separate units) in top elevation, permanently mounted on the chassis. The door is closed (as in the first view), being hinged on the left, but it is shown in partly open (dotted line) position, through which the chassis unit may be slid in and out of the housing unit during manufacture and repair operations. The door in this view is sectioned below the package delivery tray shown in FIG. 1 in order to see the top of the tray in FIG. 2.
Figures 3, 4:
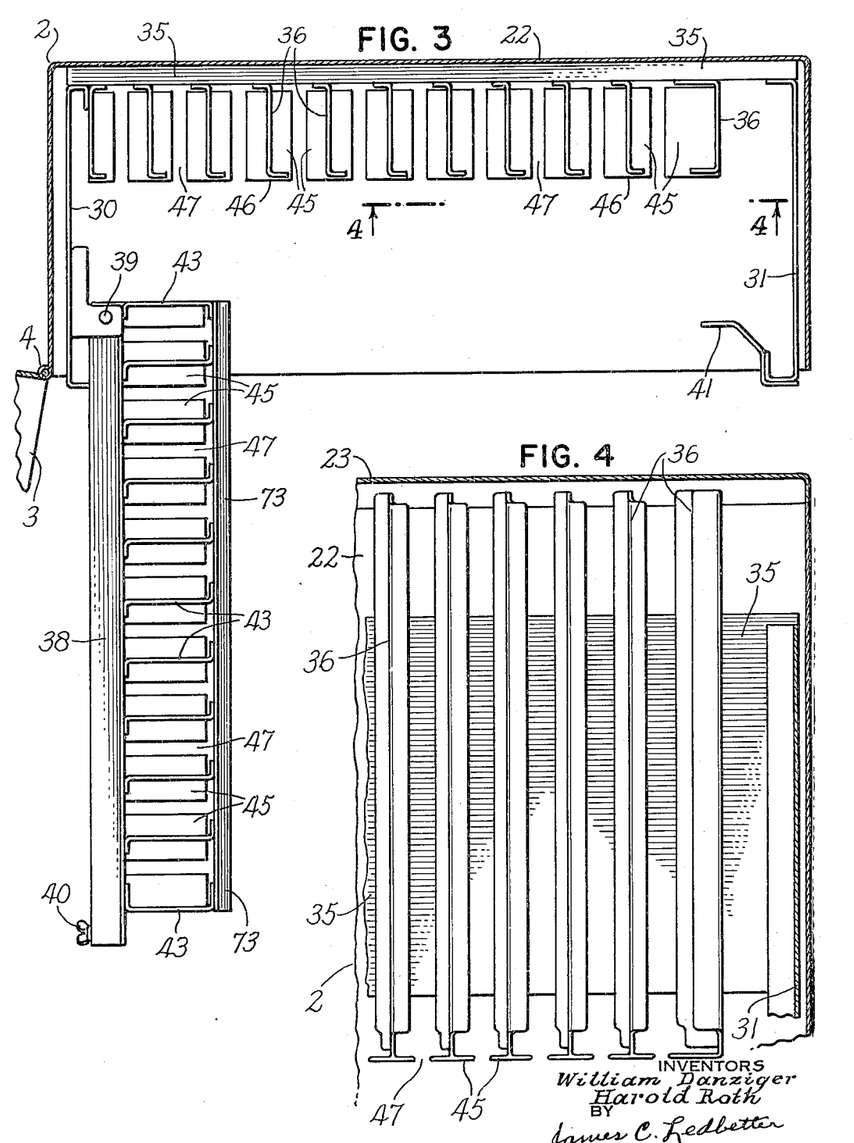
FIG. 3 is a repeat of FIG. 2 (also on the housing section plane 2—2), but with the door (a fragment shown) swung open, and the delivery tray omitted. The front row of hoppers is also pivoted outward from its supporting chassis in the housing to gain access to the rear and the front hopper rows (separate units) for stocking them with packages. The swing axes (the hinges) for the door and the front hopper unit are on the same side (left) of the machine.
FIG. 4 is a housing section measured along the horizontal line from 4 to 4, of FIG. 3, behind the swingable front hopper unit and through the right side of the housing and the chassis, thereby showing a part of the rear hopper unit in front elevation. This rear unit is permanently mounted in fixed position by a horizontal stringer supported on upright end standards (framework) of the chassis and thus free of the housing, as shown in FIGS. 2 and 3.
Figure 5:
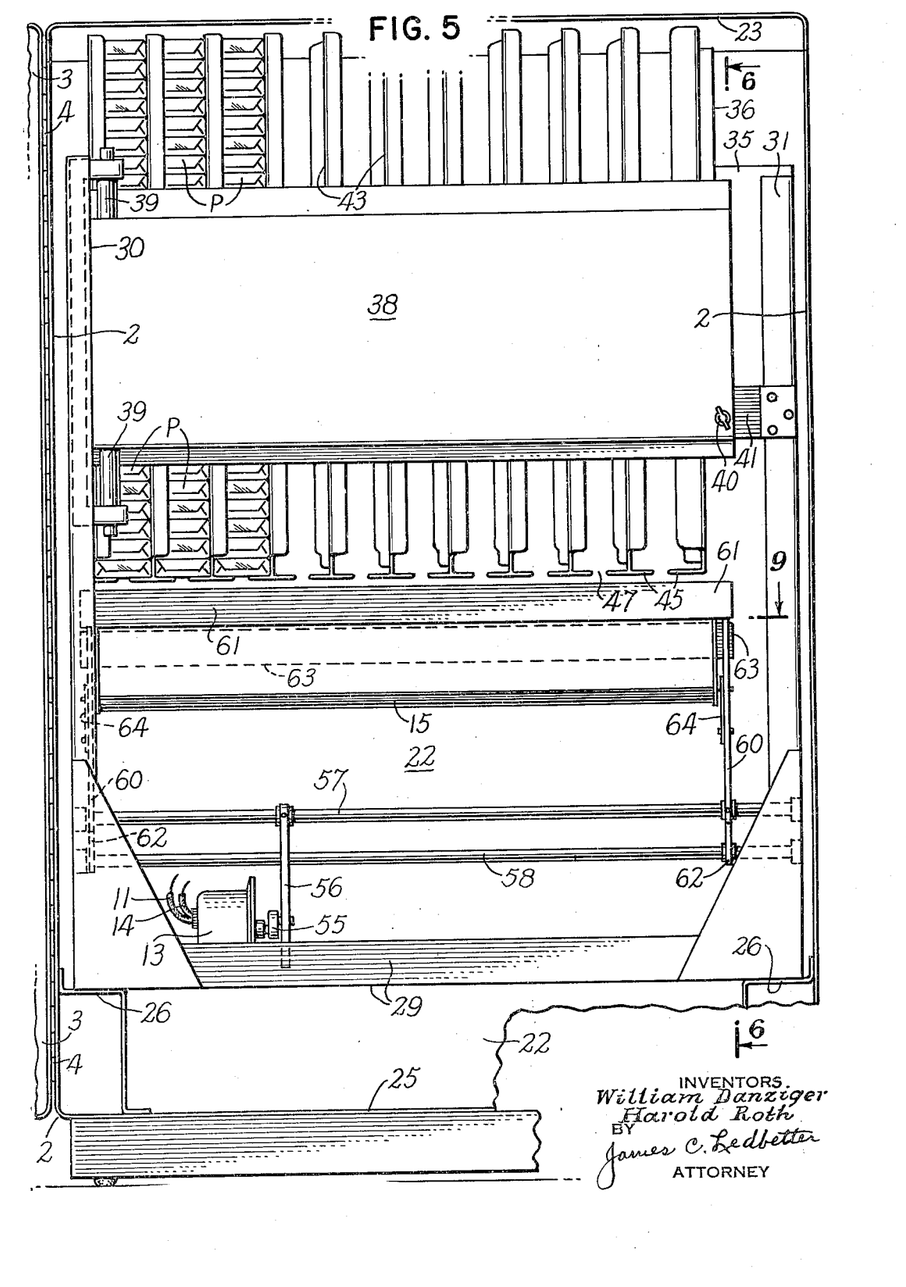
FIG. 5 is a front inside elevation, the door (a fragment shown) having been swung open to the left, but with the front hopper unit swung back (from FIG. 3 position) into place within its housing-enclosed chassis. Thus the stationary rear hopper row unit (FIG. 4) is not visible in FIG. 5. The three hoppers at the left (in the front hopper unit) are filled with packages. A motor means and two swingable package ejecting cradle sets are shown under the two hopper units and are self contained with the latter on the mobile chassis.
Figure 7:
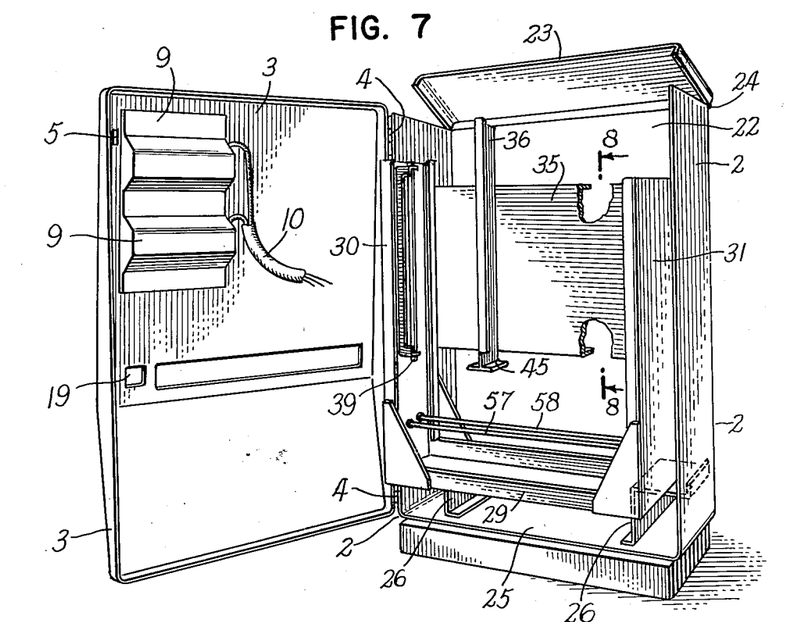
FIG. 7 is a perspective view of the housing with its door open, also its lid up, and the chassis slid part way thereinto and on pillars of the housing. Working parts are omitted in order to see more clearly the compact fit of and the relation between these two machine units, especially so in respect to the rear hopper unit (FIG. 8) of the chassis abutting the rear wall of the housing in a way to serve several purposes.
Figure 8:
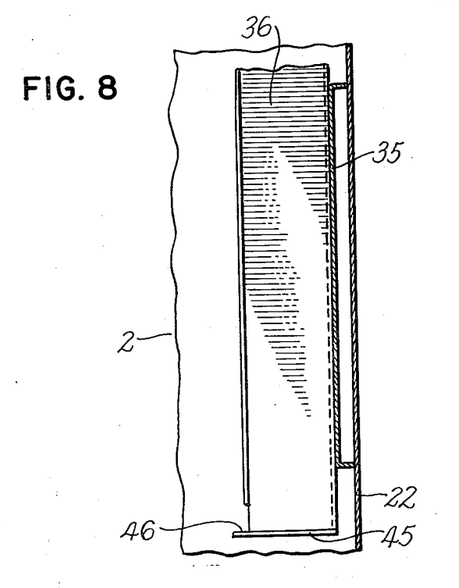

*Parts omitted for clarity, and reference to FIGS. 1, 5 and 7 for partial description*

The drawings are made from a commercial specimen of the machine. Some of its factory production parts are omitted and others schematically modified for simpler illustration of the principles of the invention. Clarity is also achieved by omitting a match book dispensing device generally included in this new cigarette vending machine but not directly related to the mechanical features claimed herein.

The drawings are laid out in a way best intended to disclose the combinations relating to the instant mechanical units, such as the housing, the chassis, the rows of hoppers, the package ejectors, the mechanical operating parts and their space saving arrangements. These features make the instant application a mechanical one.

For the purpose of this partial or introductory description, it is to be noted first that a cabinet or housing 2 (its upright end walls) is provided with a door 3 for enclosing and providing access to its interior. The door is hinged at 4 on the housing. A coin slot 5 receives a customer's money and, since the machine (in its commercial form) is electrically operated, he may then press a package-selector electrical-switch button 6 (chosen from a bank of buttons) framed in and ornamentally displayed by an escutcheon or finishing panel 7 on the front face of the door 3. The buttons 6 are spring-loaded and remain in outward switch-open position in a known manner.

In the illustrated example of the invention, there are twenty switch buttons (FIG. 1) in the bank or panel 7, one for each hopper, thus twenty hoppers, two rows of ten each. By reason thereof, there are also twenty of the selective, solenoid operated, package ejecting units (two rows of ten each), heretofore described as a part of the two swingable cradle sets.

Accordingly, the present machine readily stores and sells twenty different package brands. Such large variety is accomplished by storing a different brand in each independent hopper of the two rows of ten each thereof. In the machine illustrated, each front hopper stores twenty-four packages, and each rear hopper stores twenty-six, making a five-hundred package capacity.

From the above, it is appreciated that the machine has a novel two-way utility. It is versatile in using several hoppers for stock-piling many packages of one and the same brand (as in the prior art) but, in contrast, its two rows of twenty hoppers may store and sell that many different brands in order to achieve variety in a new way (unlike the prior art).

The switch buttons 6 (FIG. 1) in the design panel 7 are operatively assembled in a frame cover 9 (FIG. 7) mounted on the inside face of the door 3. Thus the outer panel 7 provides a display setting for the self-indicating switch buttons 6, while the inner frame cover 9 provides on the inner face of the door an operative mounting means for the buttons and their electrical circuitry.

An insulated wiring harness 10 (switch button cable) extends from the frame cover 9 to the door hinge 4, thence axially downward into the housing 2, and thereby is subjected to a minimum of axial movement when the door is opened and closed. This multiwire cable 10 contains the circuitry of the switch buttons 6 inter-connected with an electro-mechanical control system (not shown) installed inside the housing 2.

Note that a current supply cord with plug-in terminal (conductors 11 and 12) is provided at the rear of the housing 2. When it is plug-connected into an electrical outlet in the usual way, any one package-selector button 6 (pressed by a customer) acts to start a motor 13 (FIG. 5) through the one feed wire 11 direct to the motor and through a relay-circuit wire 14, by operation of an electro-mechanical control (not shown herein). Thereupon, the motor 13 operates through its circuit wires 11 and 14 to eject one selected package P into a delivery tray 15. Thus a normal sale is made.

In the event, however, that the foregoing package brand selection (first choice) is made from a switch button 6 on an empty hopper, then the machine signals the customer at an empty sign 17, in the button panel 7, to select another button 6. The customer has a large number of additional brands (push buttons 6 with brand markers) from which to select.

However, a coin return lever 18 is provided as a part of the electro-mechanical control (not shown) for the convenience of the customer. He may operate it (push the lever 18 down) and get his money back in a coin return till 19 in the usual way. Such is the action of the machine when a sale is not made.

The housing and the chassis

The housing has a back wall 22, and a lid 23 is hinged at 24 (FIGS. 6 and 7) along the horizontal top edge thereof. Thus the lid raises and lowers at the front of the machine. It is seen that the vertical swing of the lid 23 and the horizontal swing of the door 3 bring these two members into closed abutting relation, at the top front edge of the machine, as a part of the console design of the housing (indicated generally at 2), which is of rectangular shape in horizontal and vertical cross section.

A housing bottom 25 is secured to the top surface of a suitable floor base. The bottom 25 integrally joins the side and back walls 2 and 22. A skid pillar 26, which is fixed in each lower corner, imparts rigidity to the housing structure, and serves as a slide-in support for a chassis. The floor base and the pillars 26 pre-determine the location of the mechanized chassis for support of its working parts at a proper operating level within the housing 2 and in relation to a convenient height for the delivery tray 15 and other essential members on the door 3.

From the foregoing, it is seen that the console housing or cabinet 2, which encloses a removable mechanized chassis, comprises the rear wall 22, also a door 3 at the front which swings open at its left side on the cabinet hinge 4. The cabinet 2 also includes the two skid pillars 26 integral with and in the bottom corner of the cabinet and on which is supported the machine chassis (the removable storing and ejecting mechanism). The chassis is next described in more detail than in the descriptions of the figures heretofore made.

A chassis base 29 in the nature of a horizontal foot plate (FIGS. 5, 6 and 7) supports a left and a right upright standard, 30 and 31 respectively. These two vertical standards are fixed (welded) at their bottom ends to the base 29 and reinforced by four triangular brace plates (not numbered), two at the front of the chassis and two at the rear thereof. A triangular shaped brace plate, welded at each of the four corners, acts to make the two parallel spaced standards stand rigid upon the base 29. The chassis base 29 is removable and rests on the two corner pillars 26 in the housing 2.

Next, a horizontal rear stringer frame plate 35 (FIGS. 2 through 8) has its ends fixed (welded) to the top ends (and rear edges) of the left and right standards 30 and 31 rising from the chassis base 29. Thus far, it is seen that the chassis comprises, generally, a rectangularly shaped rigid frame or four members (29, 30, 31 and 35), that it rests on the two pillars 26, has a close fit within the cabinet 2, and can be slid back and forth on the pillars to remove and replace the chassis in operating position.

Upright rear hoppers 36 are fixed (welded) to the chassis rear stringer plate 35 for storing and dispensing the cigarette packages P (heretofore noted) from the rear of the machine. The hoppers 36 comprise the spaced parallel partitions carried on the inner face of the chassis rear stringer plate 35. In the drawings, the rear row of partitions 36 provides ten storage hoppers for that many different brands of cigarette packages. The rear row of ten package hoppers 36 are fixed in relation to the chassis. They are accessible for inserting packages P from the top, by raising the lid 23 (see FIGS. 1, 6 and 7). This rear row of hoppers is identified, in general, as the rear hopper unit 35, 36 and is comparable to a front row unit now explained in connection with the figure descriptions heretofore given.

As previously pointed out in the descriptions of the figures (particularly FIG. 3), a front hopper unit 38, 43 is comparable to the rear unit 35, 36 but is swingable (pivoted) in the chassis. Thus a front stringer plate 38 mounting front hoppers 43 is pivoted on a chassis hinge pin 39, which is carried on a vertical axis in a bracket fixed to the stationary left upright standard 30 of the chassis (see FIGS. 2, 3, 5, 6 and 7).

When the front stringer plate 38 is swung back into position (from FIG. 3 to FIG. 2), a wing nut 40 fastens to a stationary chassis bracket 41 and secures the stringer plate 38 at the front in closed position across the chassis. Significantly, the chassis swing axis 39 and the door swing axis 4 are parallel, on the same side of the machine, shown at the left side. Thus the door 3 and the front hopper unit 38, 43 swing open on the same side. See FIGS. 2, 3, 7, etc. This is important. It permits access to the rear hopper row 36 and front hopper row 43 for servicing.

Next, it is seen that front hopper partitions 43 (like the rear ones 36) are fixed (welded) to the rear vertical surface of the front stringer plate 38. Accordingly, they provide a front hopper unit 38, 43 which is pivoted on the vertical axis 39 at the front of the chassis, while the rear hopper unit 35, 36 is fixed within the chassis behind the front row 38, 43. Furthermore, the lower ends of the front hoppers 43 are disposed above the lower ends of the rear hoppers 36, thereby providing space (*a*) for the discharge of a package from the rear hoppers, and also (*b*) for an ejecting unit (noted later) to come to rest under the front hoppers. This in-set space provides the two advantages (*a*) and (*b*) as noted in FIGS. 6 and 18 to 21. These several views emphasize the importance of the in-set space, at the bottom of the front hopper row, of this particular machine.

A package shelf 45 is formed at the bottom of each rear and front hopper partition 36 and 43. This shelf is turned inwardly towards the adjacent package shelf 45 of the adjacent hopper partitions (see FIGS. 2, 3, 4, and so on). This package shelf 45 (in pairs) supports a column of packages P in the hopper. Each shelf 45 has a front lip extension 46 (see FIGS. 6 and 18 to 21). The lip 46 is right under and in part defines a package discharge opening (not numbered), out through which a package is discharged toward the front.

Accordingly, a package momentarily rides on the lip 46, after it has cleared the front side and edges of the hopper, and assures that the package will not hang. Two adjacent package shelves 45 (pairs) are spaced apart, thereby providing a slot or passageway 47 at the bottom of each hopper. As later seen, such slotted passageway 47 permits an ejecting arm to move forward (through the slot 47), along the two adjacent shelves 45, when pushing a package forwardly beyond the lip extension 46.

A package chute 50 leads from the front lower edge of the rear hopper row 36 (see FIG. 6) to the delivery tray 15 in the door 3 at the front of the machine. Thus the chute 50 starts from the rear hopper discharge opening at the lip 46, passes under the front hopper row 43, and turns down and outward to the tray 15, so as to guide a package P from either the rear or front row to the tray 15 where the customer may reach the package.

A guide plate 51 (see FIGS. 18 to 21) is tilted at a downward angle and fixed in the chassis just in front of the lip 46 of the discharge opening of the front hopper row 43. This guide 51 is integrally formed with a fist masking plate 52 set next to the delivery tray 15. This mask 52 is disposed at an inward angle almost perpendicular to the general plane of the chute 50. Next, a hand straightening plate 53 is integral with a masking plate 52 and is arranged above and about parallel with the general plane of the chute 50.

The hand straightener 53 acts to straight-jacket pilfering fingers and prevents them closing upon a package, in the event a small hand reaches through the space between the chute 50 and the finger straightener 53.

With the above arrangement (FIGS. 18 to 21), a package discharged from the front hopper 43 slides over the plate 51 and onto the chute 50, whereas a package delivered from the rear hopper 36 is initially projected onto the chute 50 and slides under the hand straightening plate 53. Furthermore, this three-part member 51, 52, 53 performs an additional function, that of enclosing a front ejecting unit (described later) when said unit has advanced to its forward ejecting position (see FIG. 20), and prevents its interference with a package sliding over the top guide plate 51.

*Motor operation and package ejection*

Figure 6:
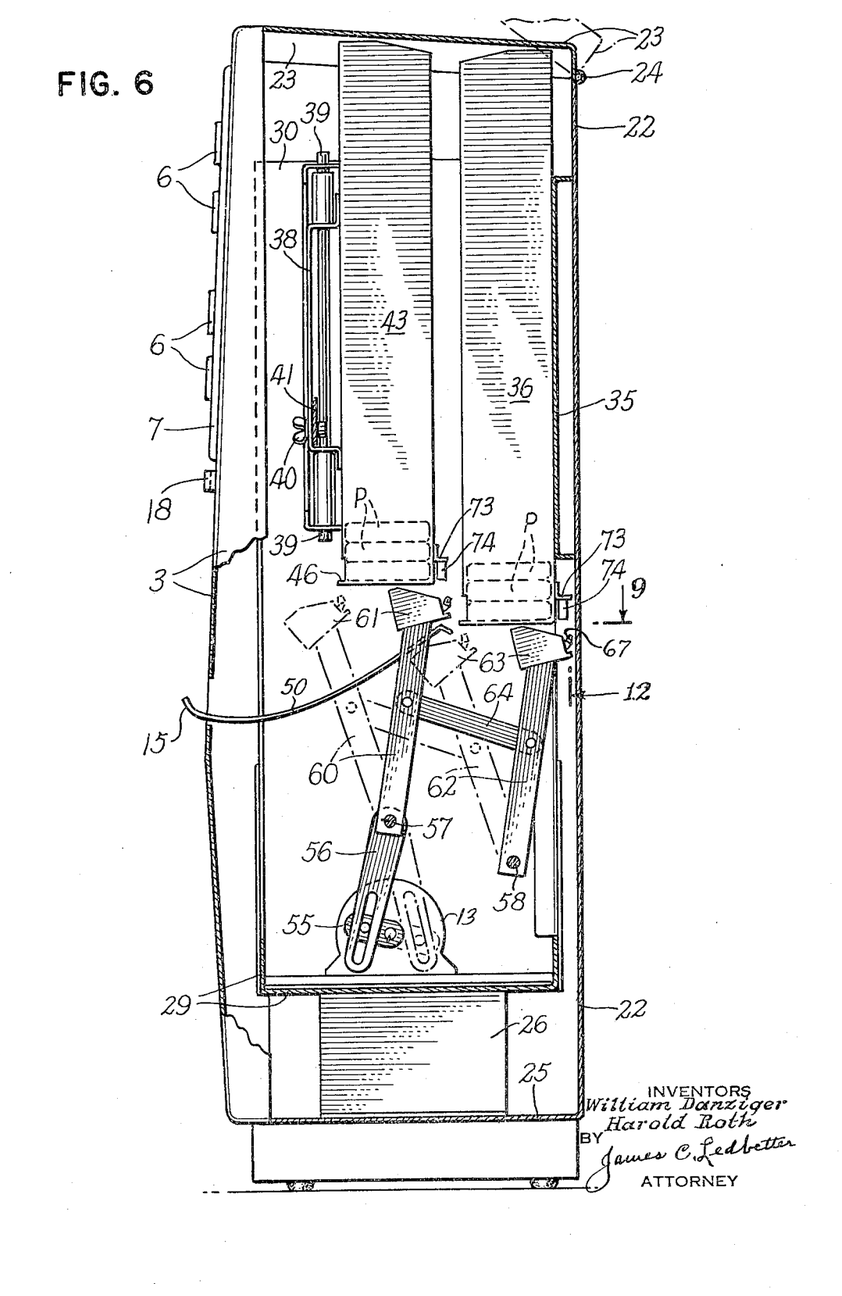
FIG. 6 is a vertical section taken on the line 6—6 of FIG. 5, through the right end of the chassis and housing, but with the door (partly broken away) shown in end elevation and closed. This is an important view showing the rear and front hopper units, also the motor means crank connected with the two (a pair of) swingable package ejecting cradle sets, one under each hopper, all in end elevation. The cradle set is in normal or still (full line) position. However, it is swung forward (fore) to its package ejected (dotted line) position and is about to swing back (aft) to complete one cycle.

A crank 55 is fixed to the shaft of the motor 13 (FIGS. 5 and 6). Also, a crank arm 56 is fixed to a rock shaft 57 journaled in the chassis above the motor and has a bearing-slot drive-pin connection with the crank 55. A free shaft 58 is mounted in the chassis to the rear of the shaft 57. It is seen that the rock shaft 57 is a power shaft and that the shaft 58 is an idle pivot. Moreover, one shaft 58 is located under the rear hopper row 36 and the other shaft 57 is located underneath the front hopper row 43.

Significantly, the two shafts 58 and 57 differ in elevation (one below the other) in an amount equal to the difference in elevation of the lower ends of the rear and front hopper rows 36 and 43. This arrangement is important in relation to the previously described in-set (stepped bottom ends) arrangement of the rear and front hopper rows heretofore explained. It is also important in reference to the motion transmitting means next described.

Further members of the motor driven means (also FIGS. 5 and 6) comprise a front pair of upright swing arms 60, one arm at each of the power shaft 57, and each arm is fixed at its lower end to this shaft. Thus, the two front swing arms 60 are power arms. Similarly, a rear pair of swing arms 62 have their lower ends freely pivoted on the idle shaft 58 and are idle arms. The front and rear arms 60 and 62 are of equal length and consequently their upper ends differ in elevation an amount equal to the difference in elevation between their two shafts 57 and 58.

Each pair of upright swing arms 60 and 62, are pivotally connected by a motion transmitting link 64, and the two pivots of the link 64 are in a plane which is parallel to a plane passing through the two shafts 57 and 58. Also, it is seen that a pair of swing arms 60 and 62 is located at each side of the chassis and, of course, the two shafts 57 and 58 extend horizontally from side to side of the chassis (as seen in FIG. 5).

The foregoing arrangement of parts 60, 62 and 64 provides for a parallelogram type of motion transmitting means, in that the front and rear arms 60 and 62 swing in unison, remain parallel to each other, and their upper ends swing on an arc under and close to the front and rear hopper rows 43 and 36. This organization of parts conserves space. It also simplifies the placement and operation of selective ejecting mechanism housed in a swingable cradle means next described.

An important feature relates to a cradle 61 carried on the upper ends of the front swing arms 60. This cradle bridges from one swing arm 60 to the other, extends parallel to the bottom ends of all the hoppers 43 in the front row, and swings close to the front hopper bottoms. The same characteristics apply to a duplicate cradle 63 carried on the upper ends of the rear swing arms 62. Note that the front cradle occupies (when at rest) the stepped in-set vacant space under the front rows of hoppers 43.

Thus the parallelogram device (parts 60, 62 and 64) swings both cradles 61 and 63 back and forth the distance measured by the dotted line positions (FIG. 6) of the two arms 60 and 62. Each cradle has the cross sectional angular shape shown in FIGS. 6, 10, 11, and 18 to 21, thus in the form of a right-angle in cross section, with an upright side extending quite close to its associated hopper, while its other side is anchored to (welded) the top end of the swing arm 60 or 62.

The foregoing swing cradles 61 and 63 carry a selective solenoid-operated package-ejecting unit, one under and for each hopper in both rear and front hopper rows 36 and 43. A description of one unit will suffice for the entire ten thereof carried in the rear cradle 63 and also the other ten thereof carried in the front cradle 61.

Figure 21:
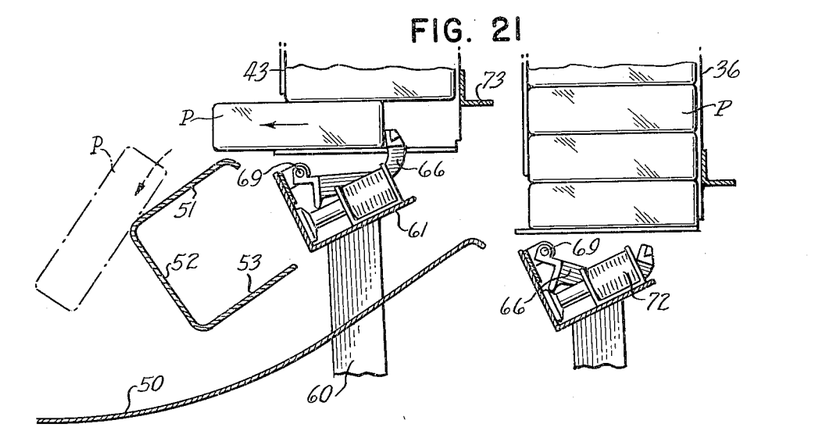
FIG. 21 shows the start of package ejection from a front hopper and is comparable to FIG. 19 showing rear ejection. Both ejections are toward the front of the machine.
Figure 22:
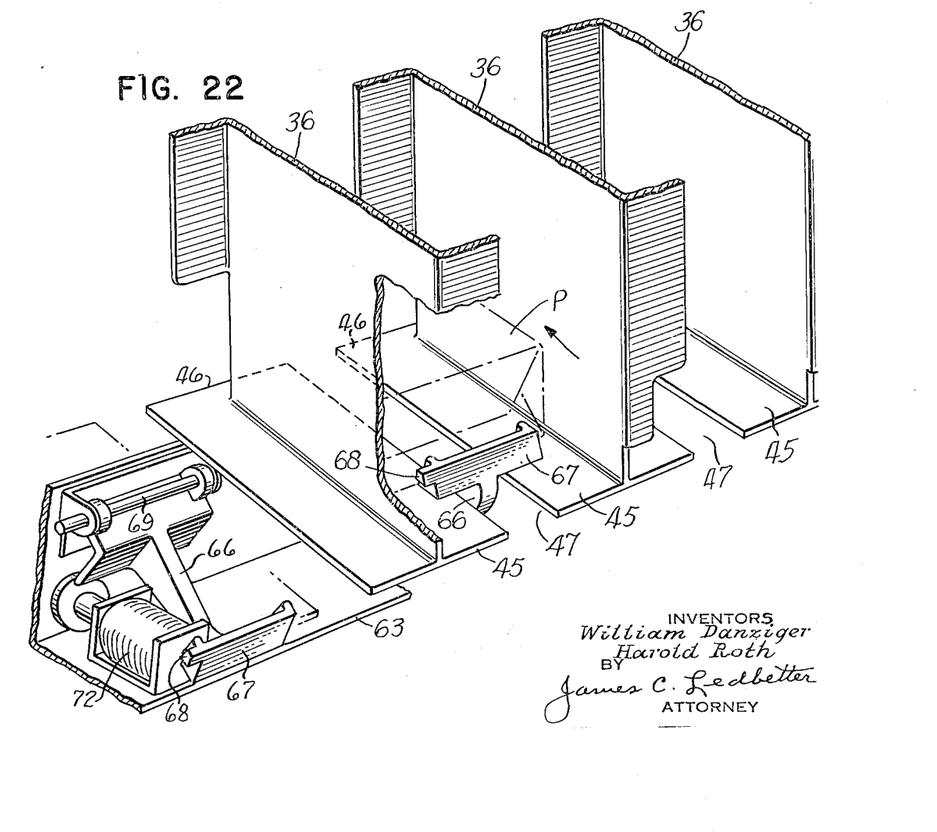
FIG. 22 is perspective view looking into the bottom and back side of either one of the hopper units, showing the ejecting finger after it has moved forward (note direction arrow) just enough to drop off its latch, down onto the hopper package shelf, and start pushing the package forward and out through the discharge (vend) opening at the front side of the hopper.

The solenoid units and their package ejecting fingers are enlarged in FIGS. 9 to 13 and shown operating in connection with an important latch-up means. Then in FIGS. 18 to 20, the ejecting units are shown in sequential operation for the rear hopper rows only. Next, FIG. 21 shows a repeat operation (of that in FIGS. 18 to 20) but for the front hopper rows only. Also, the perspective FIG. 22 aids a general understanding.

As to the package ejecting units, it is seen that a lift arm 66 (FIGS. 9, 10, etc.) has a T-cross or stub finger 67 on its outer upturned free end, while its inner lower captive end is pivoted at 69 on the upright side of the cradle 61 or 63. A description of one package ejecting unit suffices for all.

The T-finger 67 of the lift arm 66 has a detent latching nose 68 on one end. The inner pivoted end of the arm 66 has an off-set bell-crank-like motion transmitting shoulder 70, which engages a flanged head 71 of an electrical solenoid armature or plunger. The plunger head 71 has its reacting armature stem reciprocally confined in the solenoid 72. The off-set bell-crank shoulder 70 permits the arm 66 to rest beside the solenoid 72 and saves space.

A long reach bracket 73 (FIG. 6) comprises an angle strip. It extends the entire horizontal length of both rear and front hopper rows 36 and 43. It is an angle member in cross section, enlarged in FIG. 13, and is fixed behind each hopper row. This long reach bracket 73 is also noted in FIGS. 14 and 18 to 21. It is stationary and disposed just above the T-finger 67, when the latter is in its up (active) position (FIG. 14), and said finger 67 passes under it when moving forward through the slot 47 to eject a package P. This bracket 73, common to all hoppers in each row, is a convenient means of supporting an individual spring latch detent which coacts with each ejecting finger 67 under each hopper of each row thereof.

Figure 14:
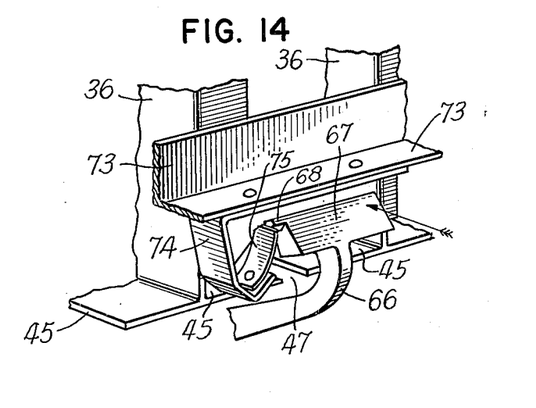
FIG. 14 is an action view of the package ejecting finger which is pivoting and camming its way up the free end of the leaf-spring latch. Under the momentary lifting force of the solenoid, the spring latch is flexing outward as the finger passes upward. The finger is about ready to latch in its up position, after which it will move straight forward, per direction arrow.
Figure 15:
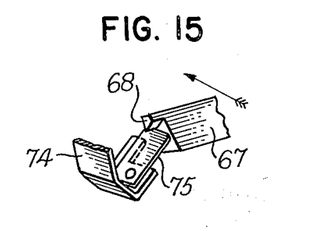
Figure 16:
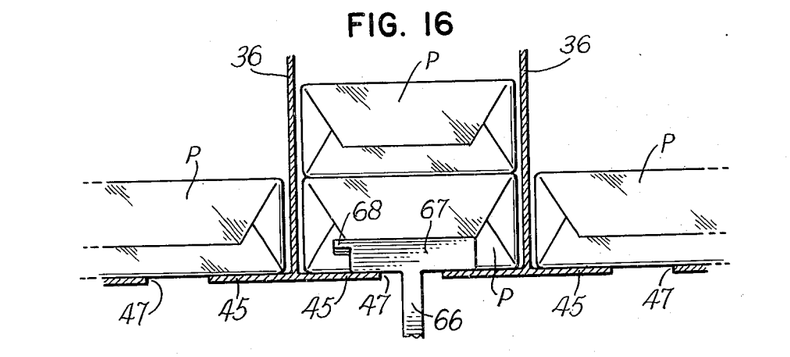
FIG. 16 is a rear view of one of the package ejecting fingers, after having dropped off its leaf-spring latch (at FIGS. 13 and 15) and onto a package shelf at the bottom end of the hopper. The finger is sliding forward along the package shelf and pushing the bottom package forward from under the column of packages and outward toward the receiving chute at the front of the machine. This view may be taken on the line 16 of FIG. 19.
Figure 17:
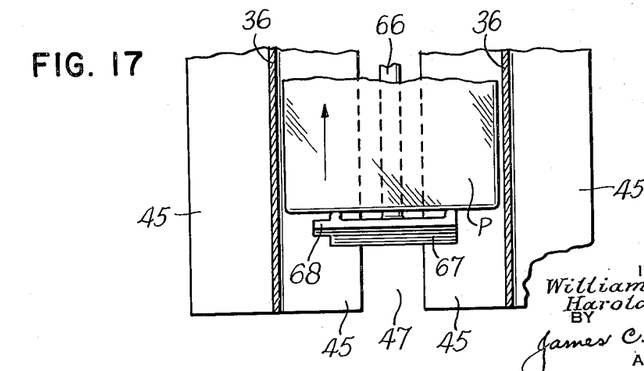
FIG. 17 is a top view of FIG. 16, except that it is looking down on the top of the bottom package being ejected, per the arrow. This view is taken on the line 17 of FIG. 19.
Figure 18:
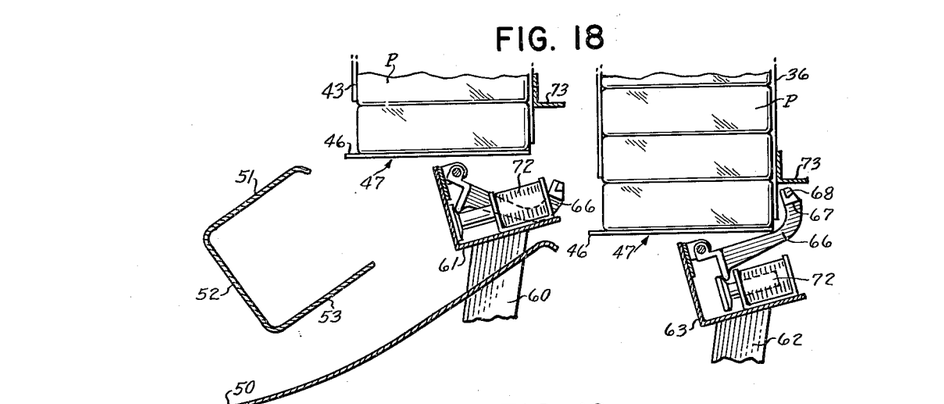
FIG. 18 shows a rear package ejecting unit in action, i.e., its solenoid is energized and tilting its finger upward, where it is latching (FIGS. 14 and 15), after which the solenoid is de-energized and its plunger drops back to still position, away from the finger, as in FIG. 19.
Figure 19:
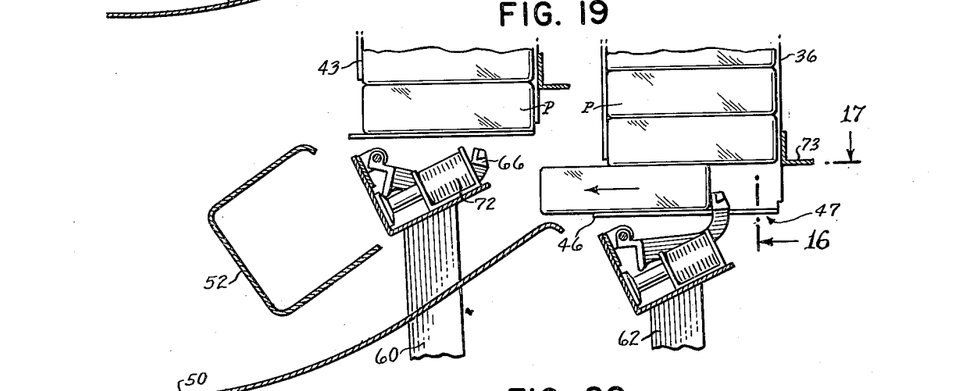
Figure 20:
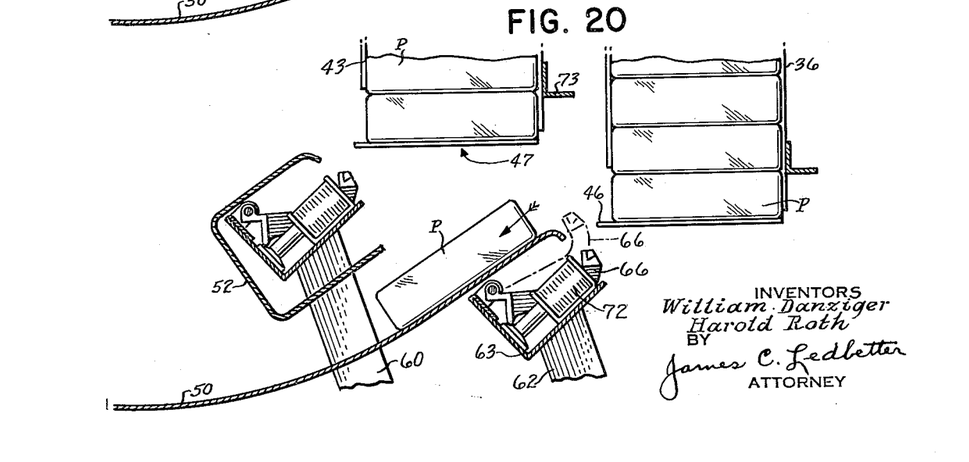
FIG. 20 completes the action of FIG. 19, by showing the rear package starting (see arrow) to slide down the chute. The ejecting finger (dotted line) has slid off the hopper base (package shelf) and dropped down (full line) to its normal position, thus delivering and cancelling the selection made in FIG. 18. Note that the column of packages has gravitated in the hopper, and the space left by the arrow-marked ejected package is occupied by the next one from above.

A short seat bracket 74 (FIGS. 12, 13, also 10, 11, etc.) is fixed on and carried by the previously described long reach bracket 73. Each short seat bracket 74 is upturned toward the detent nose 68 of each ejecting finger 67. A leaf spring latch 75 is seated (spot welded) at its lower end upon the up-turned end of the short seat bracket 74. The small leaf spring 75 has its upper end flexibly free, as best seen in FIGS. 14 and 15 demonstrating its function.

*Machine operations*

Figures 9, 10, 11:
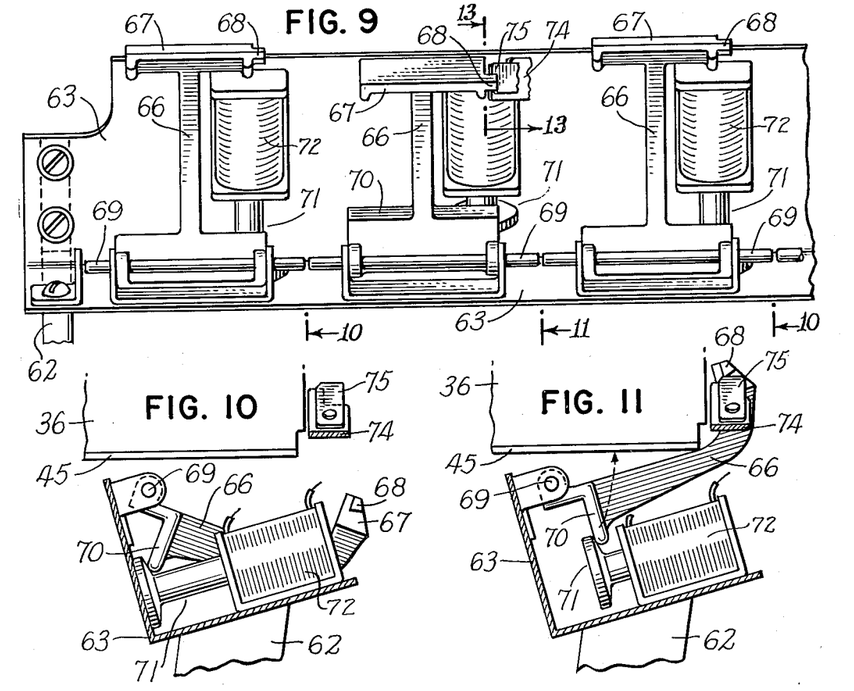
Figure 12:
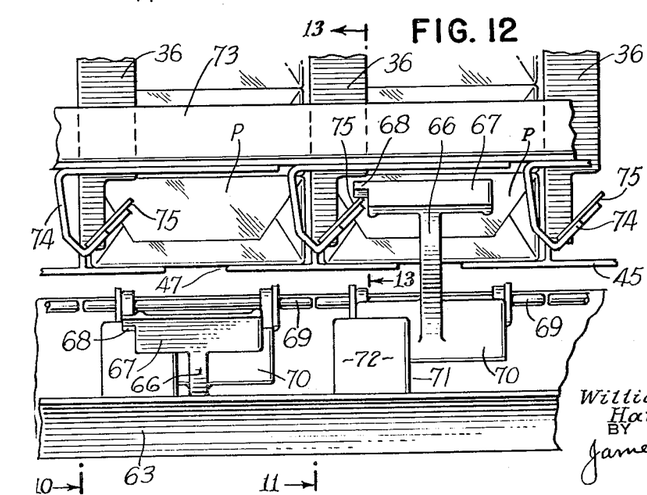
Figure 13:
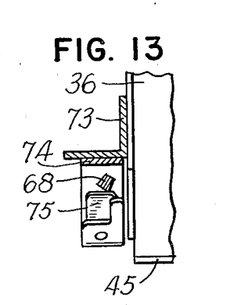
FIG. 13 is made on either one of the two section lines 13, on FIGS. 9 and 12, showing the package ejecting finger in its latched up position, thus ready to eject a package.

When a customer presses a brand selector button 6 (FIG. 1), a particular solenoid 72 is energized, causing the ejecting arm 66 to flip upwardly from its rest position (FIG. 10) to its active ejecting position (FIG. 11). In other words, the T-cross finger 67 is going up (see FIG. 14). Thereupon, it latches on the top edge of the leaf spring 75 (FIG. 15). The solenoid becomes de-energized, since the customer releases the button 6, but the arm 66 is held by the latch in up position for ejecting a package P.

Next, the motor 13 starts, thus swinging the cradle pair 61 and 63 forward. This action unblocks the in-set space underneath the front hoppers 43 and in front of the rear hoppers 36 which the forward cradle 61 had previously occupied. Now, the inset space is clear, so that a package P from the rear hoppers 36 (if the customer so selected) can be discharged onto the chute 50. See FIGS. 18 to 20 for a motion picture showing of the operating sequence for the rear hoppers 36 and FIG. 21 for the front hoppers 43.

Importantly, the combination package guide and hand straightener 52 (FIGS. 18 to 20) also acts to nest and enclose the front cradle ejecting unit 61 when the machine is ejecting from either the front or back row. Specifically, when from the front row (FIG. 21), the guide 51 keeps the package from coming in contact with the front cradle 61.

It is important to note that the short ejecting fingerlike arm 66, which passes through the package shelf slot 47, has a short radius swing when tilting upward and latching at 75 (FIG. 15). In contrast, the long upright parallelogram swing arms 60 and 61 have a long radius swing. Furthermore, the ejecting arm 66 has two motions. First, it pivots upwardly (angular motion) and then it moves horizontally (linear motion). Accordingly, when the swing arms 60 and 62 are moving around the pivots 57 and 58, the eject arm 66 is sliding, straight-line fashion, along the top surface of the package shelf pair 45 and through the slot 47 in between.

As the eject arm 66 slides through the shelf slot 47, the T-cross finger 67 rests upon the top of the package shelf 45, and it is thereby confined to straight-line movement simultaneously with the angular movement of the two swing arms 60 and 62 dragging the short eject arm 66 through the slot 47.

At the end of its forward travel, the eject finger 67 drops off package 45, but not until after the package P has entirely cleared the two side edges and upper edge of the discharge opening at the bottom front of each hopper. In other words, the shelf lip extension 46 provides some additional travel for the eject finger 67 after the package has actually cleared the discharge opening.

At the end of its travel, the eject finger 67 and arm 66 drop by gravity off the front edge lip 46 of the package shelf 45. See this action in FIG. 20, where the dotted position of arm 66 shows it coming off the lip 46, and its solid line shows it at rest alongside its solenoid 72. The cradle 63 and its ejecting arm 66 are now in readiness to return to inactive position, i.e., from dotted line (FIG. 6) back to solid line position.

From the foregoing it is seen that the forward ejecting linear motion of the arm 66 causes it to move along a straight line through the shelf slot 47, with the finger 67 dragging on top of the package shelf 45, whereas the return movement is underneath the package shelf 45 and angularly on a radius set by shaft 57 or 58.

*The cabinet hinge 4 and the chassis hinge 39*

The arrangement of the two hinges 4 and 39, as on the left side of the machine, in parallel with each other, permits the door 3 to first be swung open in order to gain access to the interior of the door for such servicing as may be required. Thereupon, it is possible to swing the front hopper unit 38, 43 outward into the projected position shown in FIG. 3, thus parallel with the open door 4.

It is seen that a service man can now stand in the crotch or corner available between the open front hopper row and the open cabinet, so as to conveniently reach both rows of hoppers and fill them with packages. In other words, both the door 3 and the front row hoppers 43 swing out in a parallel position in front of and perpendicular to the cabinet 2.

This disclosure explains the principles of the invention and the best mode contemplated in applying them, so as to distinguish the invention from others; and there is particularly pointed out and distinctly claimed the part, improvement or combination constituting this discovery.

What is claimed is:

1. In a vending machine, having a housing, with a delivery tray, and enclosing rear and front rows of hoppers, containing columns of packages, with a chute leading from all hoppers to the tray; and that improvement in combination therewith, for selectively ejecting a package from any hopper of any row thereof; which consists of a pivoted ejecting arm, having a T-finger and a solenoid operatively connected therewith, through an off-set bell crank like shoulder, the parts being so arranged that the pivoted ejecting arm rests alongside the solenoid when in inactive position, all together constituting a package ejecting unit, one such unit disposed under every hopper of all rows thereof; and the pivoted ejecting arms being in normally downward inactive positions with said T-fingers out of engaging alignment with the bottom packages of the columns in all hoppers rows, but any one ejecting arm of which, when tilted upward by its solenoid and bell-crank shoulder, places said finger in engaging alignment with one bottom package in its respective hopper; a movable support disposed under the hopper rows, on which the ejecting units are mounted; and motor means operatively connected with the movable support, actuating it fore and aft under the hoppers of all rows thereof, for ejecting that particular package engaged by the one lifted finger.

2. The vending machine as in claim 1, further characterized in respect to said package ejecting units, wherein latching means is provided, individual to each T-finger, for holding each finger in its upward position, whereby any lifted finger remains in its said engaging alignment, with said one bottom package, after the solenoid is de-energized.

3. In a vending machine, having a housing, with a delivery tray at the front thereof, and enclosing upright package storage means consisting of hoppers containing columns of packages, one to the rear of and adjacent the other, the rear hopper having its lower end below the level of the bottom end of the front hopper, and a chute leading from the bottom ends of the hoppers to the tray; and that improvement in an operating means for ejecting a package from either the rear hopper or the front hopper onto the chute and thence to the tray, which consists of upright parallel arms, mounted under the hoppers, the upright arms being of equal length, with one arm spaced from and to the rear of the other, the rear arm having its upper end located below the level of the upper end of the front arm the same distance as the rear hopper has its bottom end located below the level of the bottom end of its adjacent front hopper; a pivot supporting the lower end of each upright arm, the upper ends of which swing in a back and forth direction under the hoppers, with a link pivotally connecting the upright arms together; and a package ejecting arm horizontally disposed underneath the bottom of each hopper, each arm having a package engaging finger on its rear end, a pivot on its front end, and also an off-set shoulder adjacent its pivot; a solenoid having a plunger operatively engaging the off-set shoulder of each ejecting arm; a said arm with its finger and its solenoid plunger constituting an ejecting unit, one for each hopper; a cradle on the upper end of each arm, a said ejecting unit being mounted in each cradle, by which to swing back and forth with the upright arms under the hoppers; whereby the energization of one particular solenoid tilts its ejecting arm and finger upward into line with either a selected rear or a front package column, and ejects a selected package therefrom onto the chute; and motor means operatively connected with the upright arms for swinging them as aforesaid.

4. The vending machine as in claim 3, which is characterized by providing a plurality of said rear and said front upright hoppers, and which are arranged in two adjacent parallel rear and front hopper rows; two pair of the upright parallel arms being provided, one pair disposed at each end of and under a hopper row; two of the said cradles being provided, one fixed on the upper ends of the rear pair of arms, and the other fixed on the upper ends of the front pair of arms; thus said cradles are parallel to each other, also parallel to the hopper rows, one cradle under each hopper row, and each cradle bridging from one of its respective arms to the other; and the said motor means, being operatively interconnected with the two pairs of upright arms, for swinging them and their respective cradles forward and back under their respective hopper rows.

5. A vending machine comprising, in combination, a housing, enclosing rear and front upright stationary hoppers, for storing columns of packages, and a delivery tray, mounted within an access opening, at the front of the housing; the lower end of the rear hopper being disposed below the lower end of the front hopper, and a package discharge opening being provided at and adjacent to the lower end of, and on the front side of, each said hopper; a chute mounted in line with the discharge opening at the front side of the rear hopper, but under the discharge opening of the front hopper, leading downward from both openings, and along which the packages slide to the tray; a package ejecting finger under each hopper, mounted for movement between operative and inoperative positions, and a solenoid operatively connected with each finger for moving same to operative position; upright arms, one under each hopper, on the upper end of which the finger and solenoid are mounted; a pivot means on which the lower end of each upright arm is supported, and a link connecting the upright arms by which they swing in parallel relation under the hoppers; and motor means, operatively interconnected with the upright arms, for swinging them fore and aft under their respective hoppers.

6. The vending machine as in claim 5, and wherein said chute is disposed above the rear ejecting finger and its operating solenoid, but below the front ejecting finger and its solenoid; and also wherein said chute is disposed in alignment with and adjacent to the package discharge opening at the front side of the rear hopper, by which a package is ejected from the rear hopper directly onto it; but said chute is disposed out of alignment with and is below the discharge opening at the front side of the front hopper, by which a package is ejected from the front hopper and falls down onto it.

7. The vending machine as in claim 5, and wherein a front package guide is mounted in fixed position above the chute, is canted at a downward angle toward the delivery tray, and located forward of the front ejecting finger, also in line with the package discharge opening at the front side of the front hopper; and underneath which package guide the front ejecting finger is carried forward by the swing of its upright arm, and over which package guide a front package moves when the front ejecting finger is forward, the package guide thereby preventing the front moving package from impinging the finger as it moves from its front discharge opening forward and falls downward to the chute; and also a baffle plate, which is fixed under the package guide, at a position forward of the front finger, where the latter stops in its forward swing; and this baffle plate also being located inward from the delivery tray and access opening, thus masking the access opening and shutting off entry therethrough to the package columns.

8. The vending machine as in claim 7, but having additional features relating to the front package guide and to the baffle plate therein; which consist in making the package guide and the baffle plate integral, thus in one piece, one at an angle to the other; the upper rear edge of the package guide being disposed in line with and adjacent the lower portion of the package discharge opening at the front side of the front hopper for guiding the front moving package above the front ejecting finger; and the lower edge of baffle plate being disposed adjacent the chute, and spaced above it, with a clearance sufficient to permit a package from the discharge opening at the front side of the rear hopper to slide down the chute, under the lower edge of the baffle plate, to the delivery tray.

9. Ejecting mechanism for a vending machine having an upright hopper, and spaced shelves at the hopper bottom for supporting a column of packages, with a slot between the shelves, and a discharge opening in the hopper bottom through which the bottom package is ejected; a short arm, horizontally disposed, under the hopper, and in alignment with the slot; and a long upright swing arm under the hopper having its upper end pivotally connected to one end of the short arm, the other end of the short arm being T-shaped to form an ejecting finger; a solenoid operatively connected with the short arm, for tilting it and the T-shaped ejecting finger upwardly behind the bottom package in the column, and into a position above the shelves; motor means operatively connected with the long upright arm, for swinging it forward and back, thus pulling the short arm through the slot between the shelves, and dragging the T-shaped ejecting finger along the top of the shelves, thereby ejecting the bottom package through the discharge opening, whereupon the T-shaped ejecting finger drops off the far end of the shelves, and moves back underneath thereof to its normal position.

10. An ejecting mechanism as in claim 9, in which a latching nose is formed on the T-shaped ejecting finger, and a spring catch is mounted on the hopper adjacent the latching nose, whereby the up-tilt of the nose flexes the spring catch, and the latter latches under the nose, thus holding the T-shaped finger in up position as its starts its ejecting movement.

References Cited in the file of this patent

UNITED STATES PATENTS

| | | | |
|---|---|---|---|
| 908,344 | Simanek | Dec. 29, | 1908 |
| 1,227,799 | Kaub | May 29, | 1917 |
| 1,621,971 | Curtis | Mar. 22, | 1927 |
| 1,753,357 | Wood et al. | Apr. 8, | 1930 |
| 2,116,564 | D'Olive | May 10, | 1938 |
| 2,146,728 | Fleischer | Feb. 14, | 1939 |
| 2,399,612 | Auerbach | May 7, | 1946 |
| 2,455,976 | Caruso | Dec. 14, | 1948 |
| 2,575,129 | Rubenstein | Nov. 13, | 1951 |
| 2,643,929 | Keefe | June 30, | 1953 |
| 2,650,149 | Munz et al. | Aug. 25, | 1953 |
| 2,693,299 | Gross | Nov. 2, | 1954 |
| 2,808,961 | Gabrielsen et al. | Oct. 8, | 1957 |